US008275035B2

(12) United States Patent
Fujisawa et al.

(10) Patent No.: US 8,275,035 B2
(45) Date of Patent: Sep. 25, 2012

(54) VIDEO CODING APPARATUS

(75) Inventors: Tatsuro Fujisawa, Akishima (JP);
Yoshihiro Kikuchi, Oume (JP); Yuji Kawashima, Oume (JP); Shingo Suzuki, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1348 days.

(21) Appl. No.: 11/832,862

(22) Filed: Aug. 2, 2007

(65) Prior Publication Data
US 2008/0152004 A1 Jun. 26, 2008

(30) Foreign Application Priority Data
Dec. 20, 2006 (JP) ................... 2006-342554

(51) Int. Cl.
*H04N 7/12* (2006.01)
(52) U.S. Cl. ............... 375/240.12; 375/240.01
(58) Field of Classification Search ............. 375/240.12, 375/240.01
See application file for complete search history.

(56) References Cited

U.S. PATENT DOCUMENTS

| | | | | |
|---|---|---|---|---|
| 6,229,854 | B1 * | 5/2001 | Kikuchi et al. | 375/240.27 |
| 7,764,738 | B2 * | 7/2010 | Kim et al. | 375/240.12 |
| 2004/0233990 | A1 * | 11/2004 | Sekiguchi et al. | 375/240.16 |
| 2005/0069211 | A1 * | 3/2005 | Lee et al. | 382/239 |
| 2006/0039470 | A1 * | 2/2006 | Kim et al. | 375/240.16 |
| 2006/0109907 | A1 * | 5/2006 | Sato et al. | 375/240.16 |
| 2006/0153292 | A1 * | 7/2006 | Liang et al. | 375/240.2 |
| 2006/0165170 | A1 * | 7/2006 | Kim et al. | 375/240.12 |
| 2006/0209948 | A1 * | 9/2006 | Bialkowski et al. | 375/240.2 |
| 2006/0215763 | A1 * | 9/2006 | Morimoto et al. | 375/240.18 |
| 2008/0144721 | A1 * | 6/2008 | Suzuki et al. | 375/240.24 |

FOREIGN PATENT DOCUMENTS

| | | |
|---|---|---|
| JP | 2004-254327 | 9/2004 |
| JP | 2005-057750 | 3/2005 |
| JP | 2005-160048 | 6/2005 |
| JP | 2005244749 | 9/2005 |
| JP | 2006020217 | 1/2006 |
| JP | 2006100871 | 4/2006 |

OTHER PUBLICATIONS

Espacenet Search, Espacenet Result list, Aug. 2011.*
ISO-IEC 13818-2 2nd edition Dec. 15, 2000.*
International Telecommunication Union, "Advanced video coding for generic audiovisual services," Series H: Audiovisual and Multimedia Systems, Infrastructure of audiovisual services—Coding of moving video, H.264, Mar. 2005, 113-184.

* cited by examiner

*Primary Examiner* — Taghi Arani
*Assistant Examiner* — Shan Elahi
(74) *Attorney, Agent, or Firm* — Pillsbury Winthrop Shaw Pittman, LLP

(57) ABSTRACT

One embodiment of the invention provides a video coding apparatus including an intraprediction section that generates prediction signals by plural intraprediction modes, an interprediction section that generates prediction signals by plural interprediction modes, and a first determination section that selects a first prediction mode to select a prediction signal by the first prediction mode from among the prediction signals by the plural intraprediction modes and the plural interprediction modes. The first determination section includes a second determination section that selects a second prediction mode from among the plural interprediction modes, a candidate limiting section that selects at least one of the plural intraprediction modes based on the second prediction mode, a third determination section that selects a third prediction mode from among the at least one of the plural intraprediction modes and a fourth determination section that selects the first prediction mode from among the second and third prediction modes.

3 Claims, 12 Drawing Sheets

FIG. 11
• INTERPREDICTION
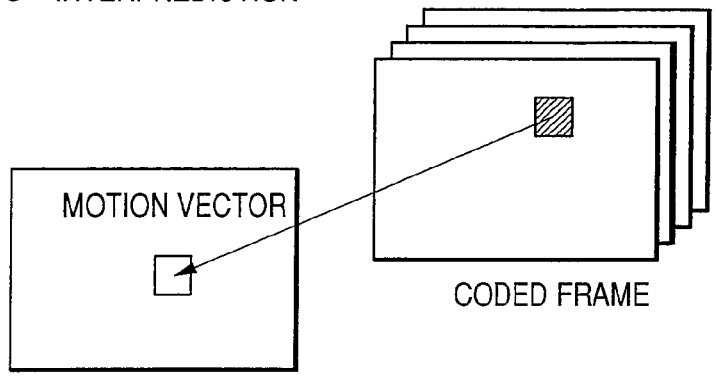
MOTION VECTOR IS PREDICTED FROM CODED FRAME ABOUT BLOCK AND PREDICTION IMAGE IS GENERATED
High Profile
PREDICTION BLOCK SIZE
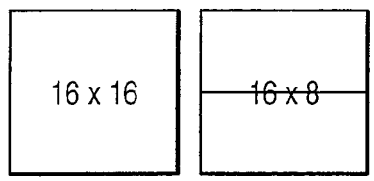
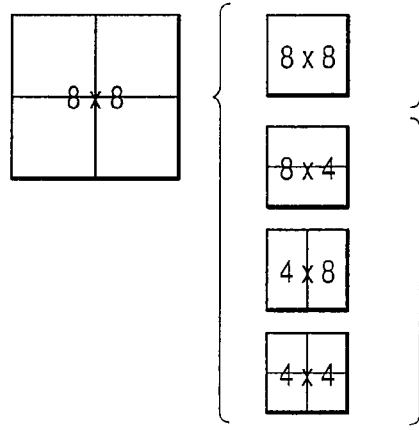
DCT BLOCK SIZE
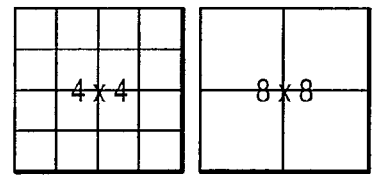
*WHEN FOUR SUBMACRO BLOCKS ARE ALL 8 x 8
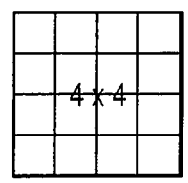
TO LIMIT TO 8 x 8 OR MORE
(SUBSTANTIAL) TOTAL NUMBER OF PREDICTION MODES OF INTERPREDICTION = 4 x 2 = 8

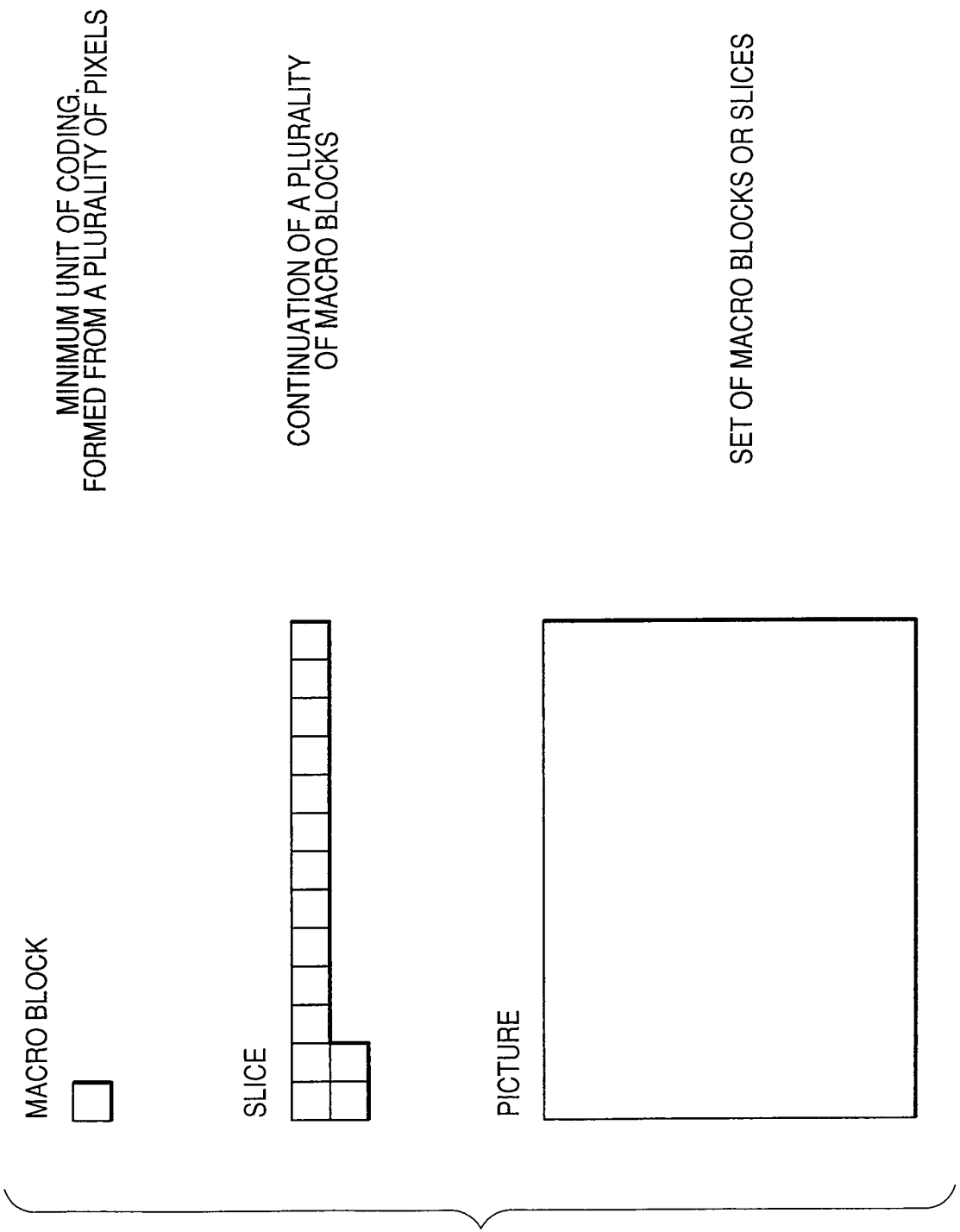

VIDEO CODING APPARATUS

CROSS-REFERENCE TO RELATED APPLICATIONS

This application is based upon and claims the benefit of priority from Japanese Patent Application No. 2006-342554, filed Dec. 20, 2006, the entire contents of which are incorporated herein by reference.

BACKGROUND

1. Field

One embodiment of the invention relates to a video coding apparatus and a video coding method for determining one prediction mode from plural prediction modes including an intraprediction mode and an interprediction mode.

2. Description of the Related Art

H.261 and H.263 of International Telecommunication Union Telecommunication Standardization Sector (ITU-T) and MPEG-1, MPGE-2, MPGE-4 of Moving Picture Expert Group (MPGE) of International Organization for Standardization (ISO), etc., are developed as standard technologies of video coding. H.264 standardized by ISO and ITU jointly is a next-generation video coding method inherited from the technologies of H.261 to H.263, MPGE-1 to MPEG-4, etc., and further developed (See, for example, ITU-T Recommendation H.264 (2003), "Advanced Video Coding for generic audiovisual services" |ISO/IEC 14496-10: 2003, "Information technology, Coding of audio-visual objects—Part 10: Advanced video coding). However, H.264 involves a problem of a large processing amount although it achieves high data compression. Particularly, an encoder is required high computation processing capability to perform encode processing in real time in recording of digital broadcasting, etc.

The processing amount for determining a prediction mode in the entire coding processing is large to achieve video coding processing based on standardization specifications, etc., of H.264. Therefore, if the load on the apparatus is high, real-time coding processing is late. If a coded stream is played back, there is a possibility that defective conditions of dropping frames, extremely slow movement of an object, etc., may occur.

Particularly, for example, pixels in the same picture are referred and a prediction image is generated in High Profile of H.264 adopted in High Definition Digital Versatile Disk (HD DVD), etc. FIG. 10 shows details of intraprediction. The block size of 8×8 pixels can be used for the block size of prediction in High Profile in addition to the block size of 4×4 and 16×16 used in Main Profile. Therefore, the number of the prediction modes of intraprediction is 22 in total (nine modes of prediction block size 4×4 pixels, four modes of 16×16 pixels, and nine modes of 8×8 pixels).

FIG. 11 shows details of interprediction of referring pixels of pictures coded in the past and generating a prediction image. For each prediction block size of 8×8 pixels or more, which is the prediction image generation unit, the DCT block size (for DCT converting) of 8×8 pixels can be used in High Profile in addition to the block size of 4×4 pixels used in Main Profile. Therefore, if the prediction block sizes are limited to 16×16 pixels, 16×8 pixels, 8×16 pixels, and 8×8 pixels, the number of types of DCT block sizes is increased to two and thus the number of substantial prediction modes is increased from four to eight.

As the number of options of the prediction modes is increased as described above, the image quality of a video with a high resolution improves in H.264 High Profile. On the other hand, since a prediction mode is selected from among all prediction modes, the necessary processing amount increases with an increase in the number of the options of the prediction modes.

Particularly, in P picture and B picture for which the interprediction can be used, the prediction mode can be selected from both intraprediction and interprediction and thus the number of the options of the prediction modes is large. The P picture refers to a picture to refer pixels of one picture coded in the past in interprediction and generate a prediction image, and the B picture refers to a picture to refer pixels of two pictures coded in the past in interprediction and generate a prediction image.

Generally, the prediction accuracy of the interprediction is often higher than that of the intraprediction. The prediction mode of the interprediction is more likely to be selected for the P picture and the B picture. The total number of the prediction modes of the intraprediction is 22 and the total number of the prediction modes of the interprediction is eight as described above. Thus determination of the prediction mode of the intraprediction, which is less likely to be selected, requires a larger processing amount and the efficiency is very low.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 11 shows a drawing to describe interprediction modes in H.264; and

FIG. 12 is an exemplary drawing to describe a macro block, a slice, and a picture.

DETAILED DESCRIPTION

Various embodiments according to the invention will be described hereinafter with reference to the accompanying drawings. In general, according to one embodiment of the invention, a video coding apparatus includes: a block dividing section that divides each of frames of a video signal into a plurality of blocks; an intraprediction section that generates prediction signals by a plurality of intraprediction modes for each of the blocks divided by the block dividing section; an interprediction section that generates prediction signals by a plurality of interprediction modes for each of the blocks divided by the block dividing section; and a first determination section that selects a first prediction mode to select a prediction signal by the first prediction mode from among the prediction signals by the plurality of intraprediction modes and the prediction signals by the plurality of interprediction modes. The first determination section includes: a second determination section that selects a second prediction mode from among the plurality of interprediction modes; a candidate limiting section that selects at least one of the plurality of intraprediction modes based on the second prediction mode selected by the second determination section; a third determination section that selects a third prediction mode from among the at least one of the plurality of intraprediction modes selected by the candidate limiting section; and a fourth determination section that selects the first prediction mode from among the second prediction mode selected by the second determination section and the third prediction mode selected by the third determination section.

Figure 1:
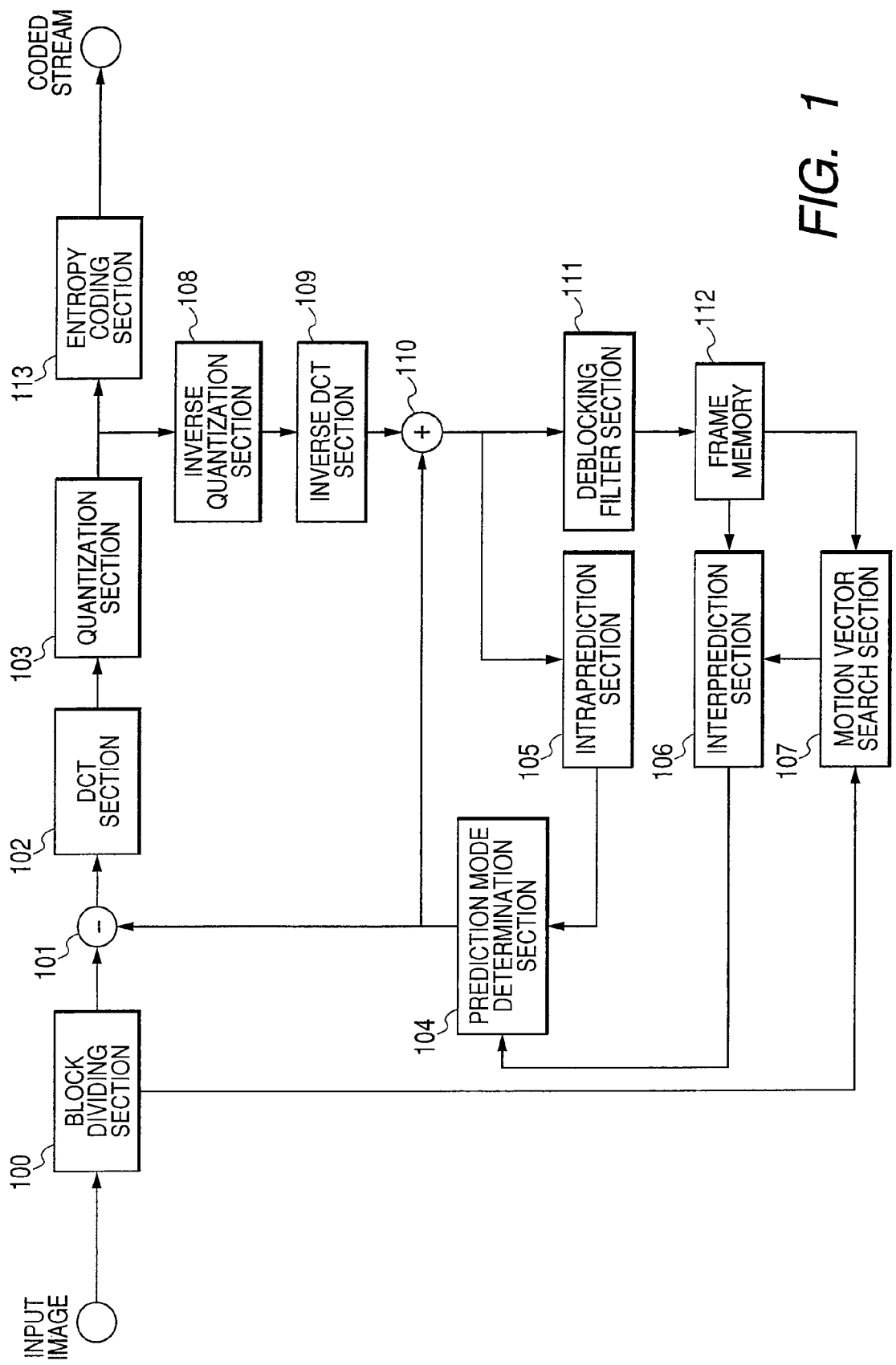
FIG. 1 is an exemplary block diagram of an H.264 encoder.
Figure 2:
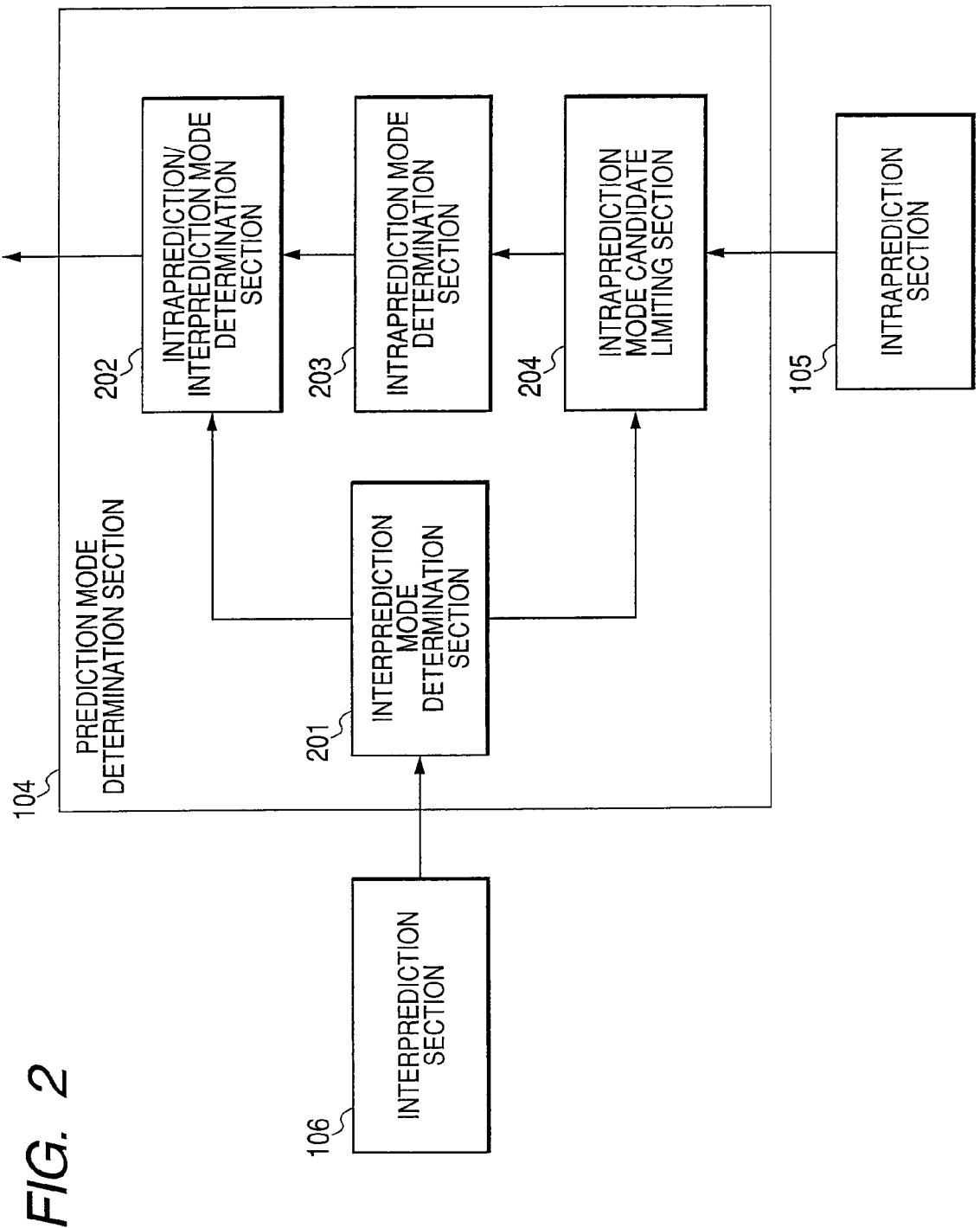
FIG. 2 is an exemplary block diagram of a prediction mode determination section of the H.264 encoder.

FIGS. 1 and 2 are exemplary block diagrams to show the configuration of an encoder based on H.264 standard as one embodiment of a video coding apparatus. FIG. 1 is an exemplary block diagram of the whole H.264 encoder and FIG. 2 is an exemplary block diagram of a prediction mode determination section of the H.264 encoder.

First, a block dividing section 100 divides an input image into blocks as coding units. An intraprediction section 105 and an interprediction section 106 generate prediction images by prediction for each block and prediction mode information required for generating prediction images in decoding. The prediction images and the prediction mode information are input to a predication mode determination section 104 as prediction mode candidates. The prediction image generated in the interprediction section 106 is obtained by motion compensation based on a motion vector obtained in a motion vector search section 107.

The prediction mode determination section 104 determines one optimum prediction mode from among the input prediction mode candidates and outputs a prediction image and prediction mode information of the optimum prediction mode. A residual generation section 101 generates a residual image indicating an error between the prediction image and the input image. A DCT section 102 executes Discrete Cosine Transform (DCT) of the residual image and provides a DCT coefficient and a quantization section 103 quantizes the DCT coefficient and provides a quantization DCT coefficient. An entropy coding section 113 executes entropy coding of the quantization DCT coefficient and the prediction mode information of the optimum prediction mode and provides a coded stream.

To generate a prediction image in the successive block or frame, an inverse quantization section 108 inversely quantizes the quantization DCT coefficient and an inverse DCT section 109 performs inverse DCT to provide an inverse DCT image. An addition section 110 adds the inverse DCT image and the prediction image of the optimum prediction mode to provide an addition image. The addition image is used as a reference image in the intraprediction section 105. A deblocking filter section 111 performs deblocking filtering of the addition image to provide a local decode image. The local decode image is stored in a frame memory section 112 and is used as a reference image together with the addition image in the interprediction section 106.

FIG. 2 is an exemplary block diagram to show the details of the prediction mode determination section 104. Prediction images and prediction mode information as prediction mode candidates indicating a group of a plurality of prediction modes are input to the prediction mode determination section 104 from the intraprediction section 105 and the interprediction section 106. The prediction images and the prediction mode information of the prediction mode candidates by interprediction input from the interprediction section 106 to the prediction mode determination section 104 are input to an interprediction mode determination section 201. The interprediction mode determination section 201 determines an optimum prediction mode of interprediction from among the prediction mode candidates by interprediction and outputs the prediction image and the prediction mode information of the optimum prediction mode by interprediction to an intraprediction/interprediction mode determination section 202. It also outputs the prediction block size and the DCT block size of the optimum prediction mode by interprediction to an intraprediction mode candidate limiting section 204.

On the other hand, the prediction images and the prediction mode information of the prediction mode candidates by intraprediction input from the intraprediction section 105 to the prediction mode determination section 104 are input to the intraprediction mode candidate limiting section 204. The intraprediction mode candidate limiting section 204 selects at least one of the prediction mode candidates of intraprediction in accordance with the prediction block size and the DCT block size of the optimum prediction mode of interprediction input from the interprediction mode determination section 201, and outputs the prediction images and the prediction mode information of the selected prediction mode candidates by intraprediction to an intraprediction mode determination section 203. The intraprediction mode determination section 203 selects the optimum prediction mode by intraprediction from among the selected prediction mode candidates by intraprediction in the intraprediction mode candidate limiting section 204 and outputs the prediction image and the prediction mode information of the optimum prediction mode by intraprediction to the intraprediction/interprediction mode determination section 202. The intraprediction/interprediction mode determination section 202 selects one of the optimum prediction mode by intraprediction and the optimum prediction mode by interprediction as the optimum prediction mode and outputs the prediction image and the prediction mode information thereof.

In the embodiment, the intraprediction mode candidate limiting section 204 selects the prediction mode candidates of intraprediction input to the intraprediction mode determination section 203, thereby reducing the processing amount in the intraprediction mode determination section 203. By fixedly selecting the prediction mode candidates, it becomes impossible to handle images of various natures and there is a possibility that the image quality may be remarkably degraded. However, the prediction mode candidates of intraprediction are adaptively selected based on the prediction block size and the DCT block size of the optimum prediction mode having correlation with selection of the prediction mode by intraprediction, whereby the processing amount of the prediction mode determination can be reduced while degradation of the image quality is suppressed. The specific processing operation of the intraprediction mode candidate limiting section 204 for realizing the processing described above will be discussed with reference to FIGS. 3 to 8.

Figure 3:
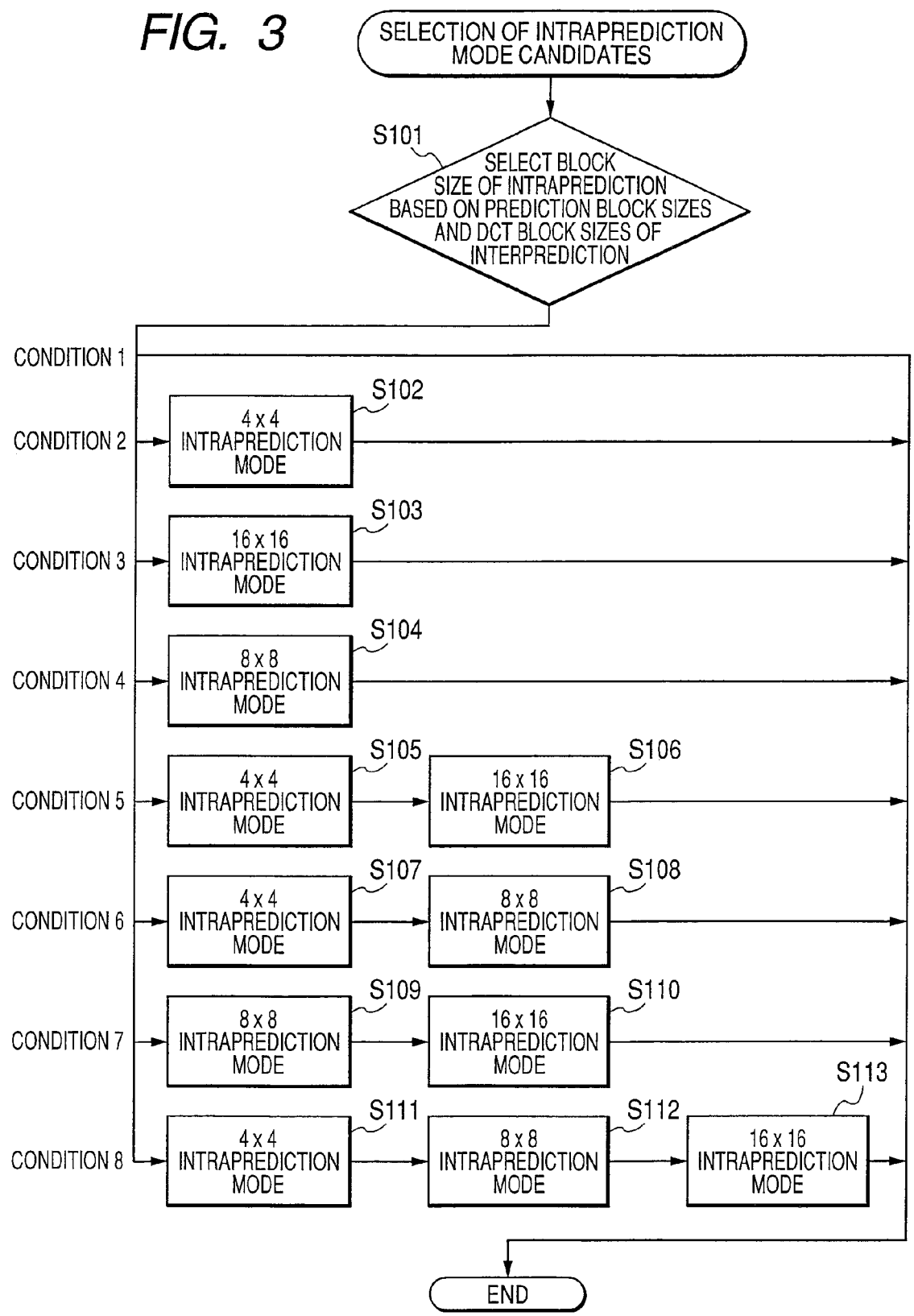
FIG. 3 is a flowchart to show an example of the basic processing operation of an intraprediction mode candidate limiting section.
Figure 4:
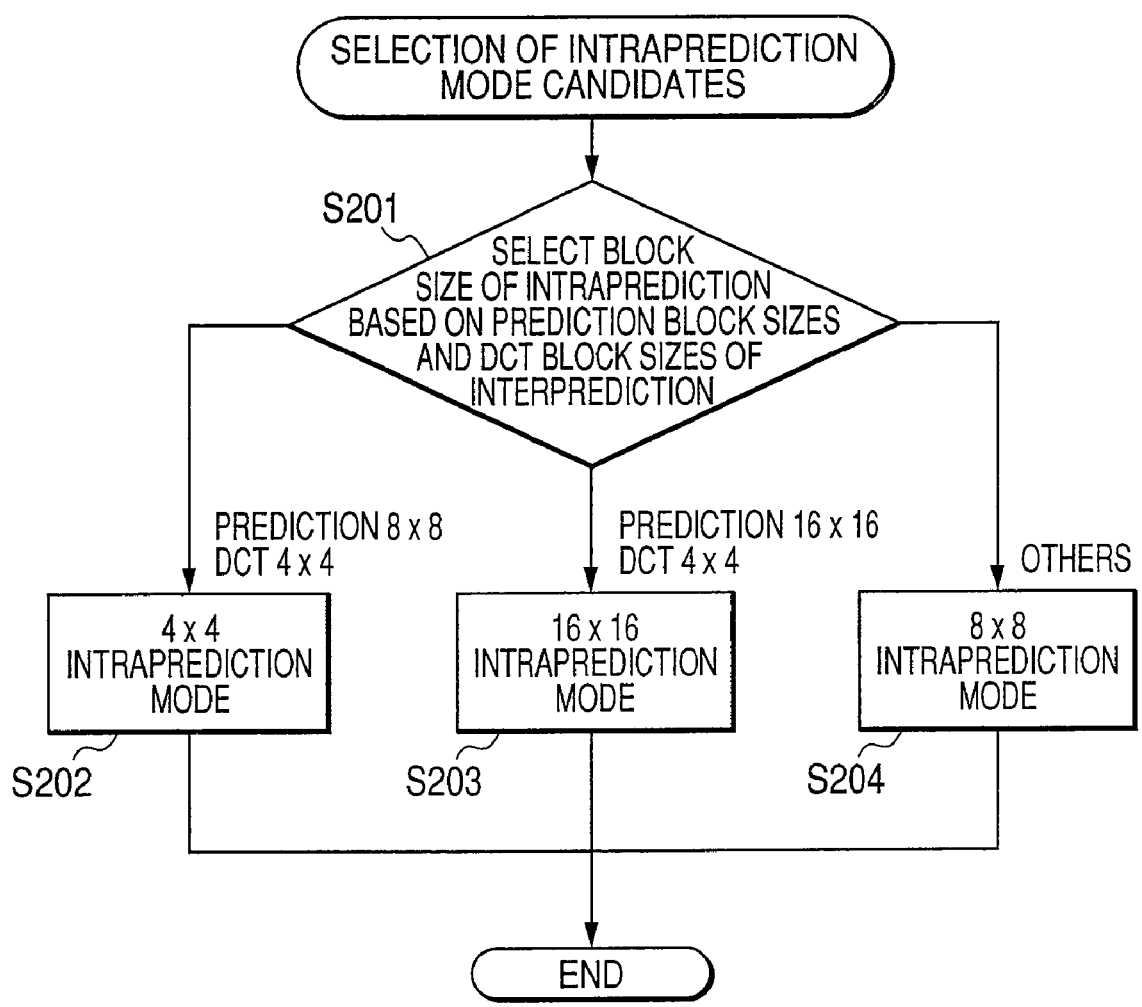
FIG. 4 is an exemplary flowchart to show the processing operation of an intraprediction mode candidate limiting section in a first example.
Figure 5:
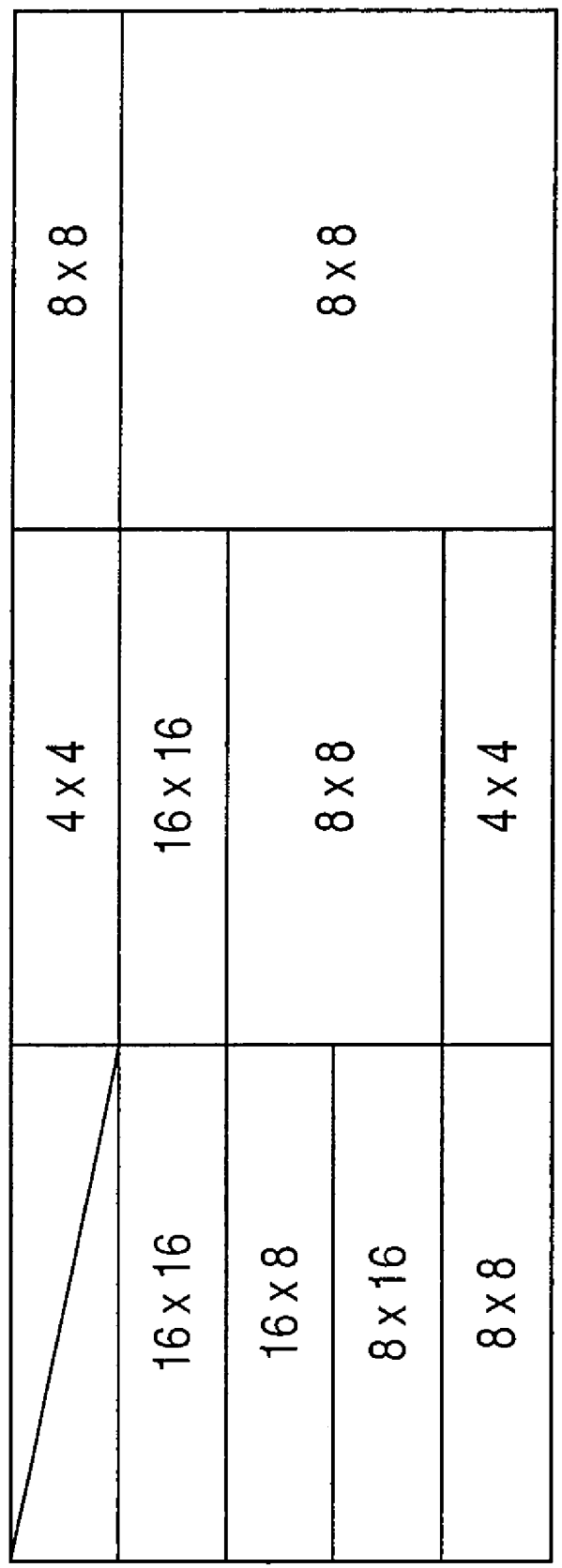
FIG. 5 shows an exemplary selection method of intraprediction mode candidates in the first example shown in FIG. 4.

FIG. 3 shows an example of the basic processing operation of the intraprediction mode candidate limiting section 204. In the example of the basic processing operation, the prediction block size of the intraprediction mode (4×4, 8×8, 16×16) is selected based on the prediction block size and the DCT block size of the optimum prediction mode by interprediction (S101). As a selection method of three types of prediction block sizes, $2^3=8$ ways are possible. The ways includes the case where none are executed (all skip) and the case where all are executed (no skip). Intraprediction mode candidates to make an intraprediction mode determination are selected in prediction block size units in accordance with conditions 1 to 8 determined from the prediction block size and the DCT block size of the optimum prediction mode by interprediction. A first example, a second example, and a third example indicating specific selection conditions are shown below:

FIG. 4 shows an exemplary processing operation of the intraprediction mode candidate limiting section 204 as the first example. FIG. 5 shows an exemplary relation with the prediction block sizes and the DCT block sizes for interprediction relative to the selection method of the intraprediction mode candidates. The column indicates the prediction block sizes and the row indicates the DCT block sizes.

In the example, as in the basic processing operation example shown in FIG. 3, the prediction block size of the intraprediction mode (4×4, 8×8, 16×16) is selected from the prediction block sizes and the DCT block sizes for interprediction. If the DCT block size for interprediction is 8×8, the prediction block size 8×8 of the intraprediction mode is selected. If the DCT block size of the optimum prediction candidate by interprediction is 4×4, the prediction block size of the intraprediction mode is selected according to the prediction block size for interprediction. If the prediction block size for interprediction is large like 16×16, a large size like 16×16 is selected as the prediction block size for intraprediction. In contrast, if the prediction block size for interprediction is small like 8×8, a small size like 4×4 is also selected as the prediction block size for intraprediction. For the intermediate sizes 16×8 and 8×16, 8×8 is selected as the prediction block size for intraprediction (S201).

In the first example, only simple determination is made as compared with second and third examples described below and thus an increase in the processing amount caused by overhead of introduction of the technique is the smallest.

Figure 6:
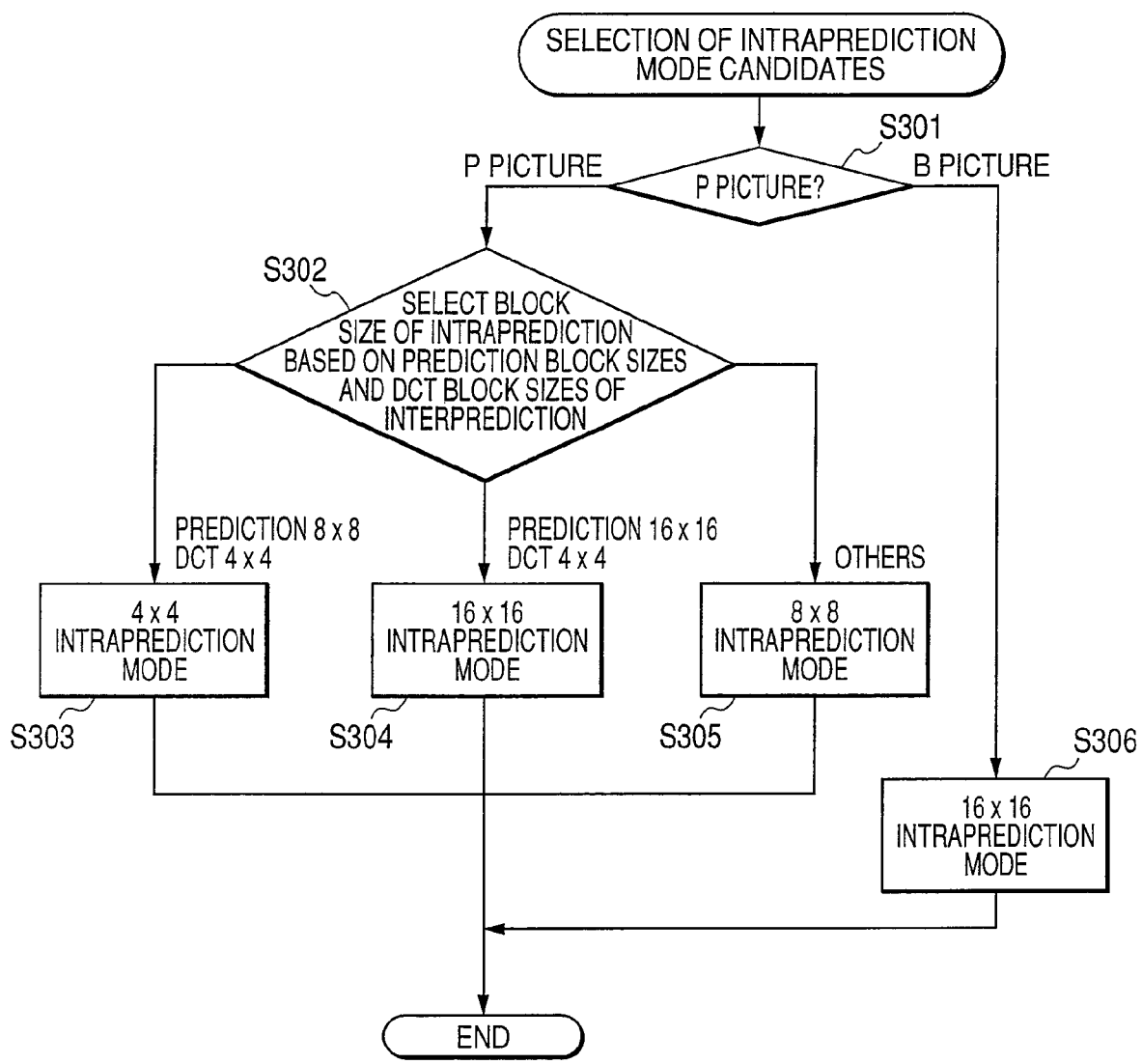
FIG. 6 is an exemplary flowchart to show the processing operation of an intraprediction mode candidate limiting section in a second example.
Figure 7:
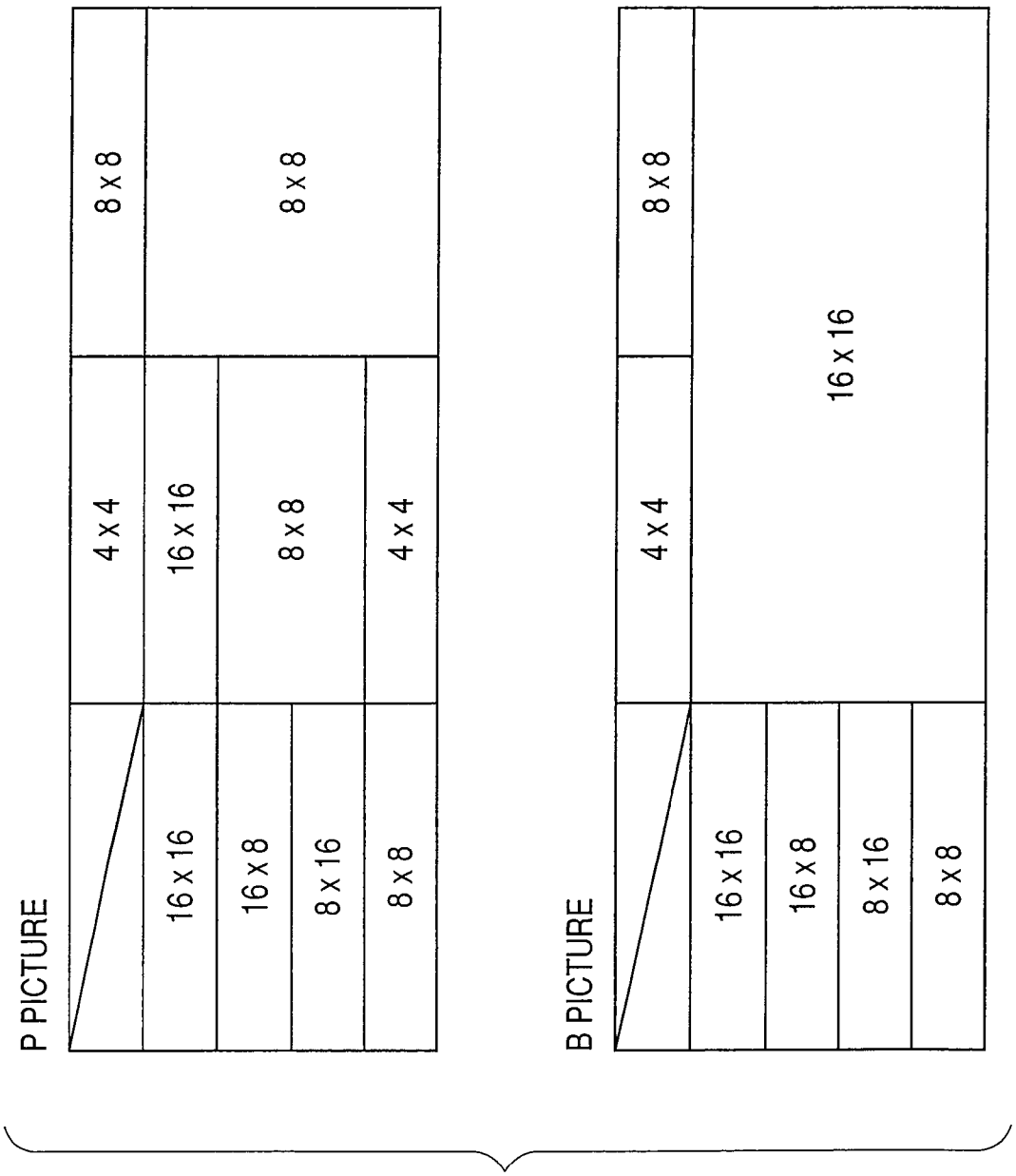
FIG. 7 shows an exemplary selection method of intraprediction mode candidates in the second example shown in FIG. 6.

FIG. 6 shows an exemplary processing operation of the intraprediction mode candidate limiting section 204 as a second example. FIG. 7 shows an exemplary relation with the prediction block sizes and the DCT block sizes of interprediction relative to the selection method of the intraprediction mode candidates. The column indicates the prediction block sizes and the row indicates the DCT block sizes.

In the example, as in the basic processing operation example shown in FIG. 3, the prediction block size of the intraprediction mode (4×4, 8×8, 16×16) is selected based on the prediction block size and the DCT block size for interprediction. First, it is determined which the picture to which the macro block to be coded belongs P or B pictures (S301). If the picture is a P picture, similar processing to that in the first example is performed (S302). If the picture is a B picture, the block size 16×16 is selected as the prediction block size for intraprediction regardless of the prediction block size, the DCT block size of interprediction.

In the second example, the condition that if the picture is a B picture, the prediction block size for intraprediction is unconditionally set to 16×16 is added to the first example. Since the B picture enables prediction from two pictures when executing interprediction, the prediction by interprediction for B picture is more likely to be selected than that for the P picture. Therefore, in the B picture, it is harder to select the intraprediction mode than in the P picture. Therefore, the prediction block size of intraprediction is unconditionally set to the block size 16×16 wherein the number of prediction modes is the smallest, so that more adaptive selection is made possible than in the first example.

Figure 8:
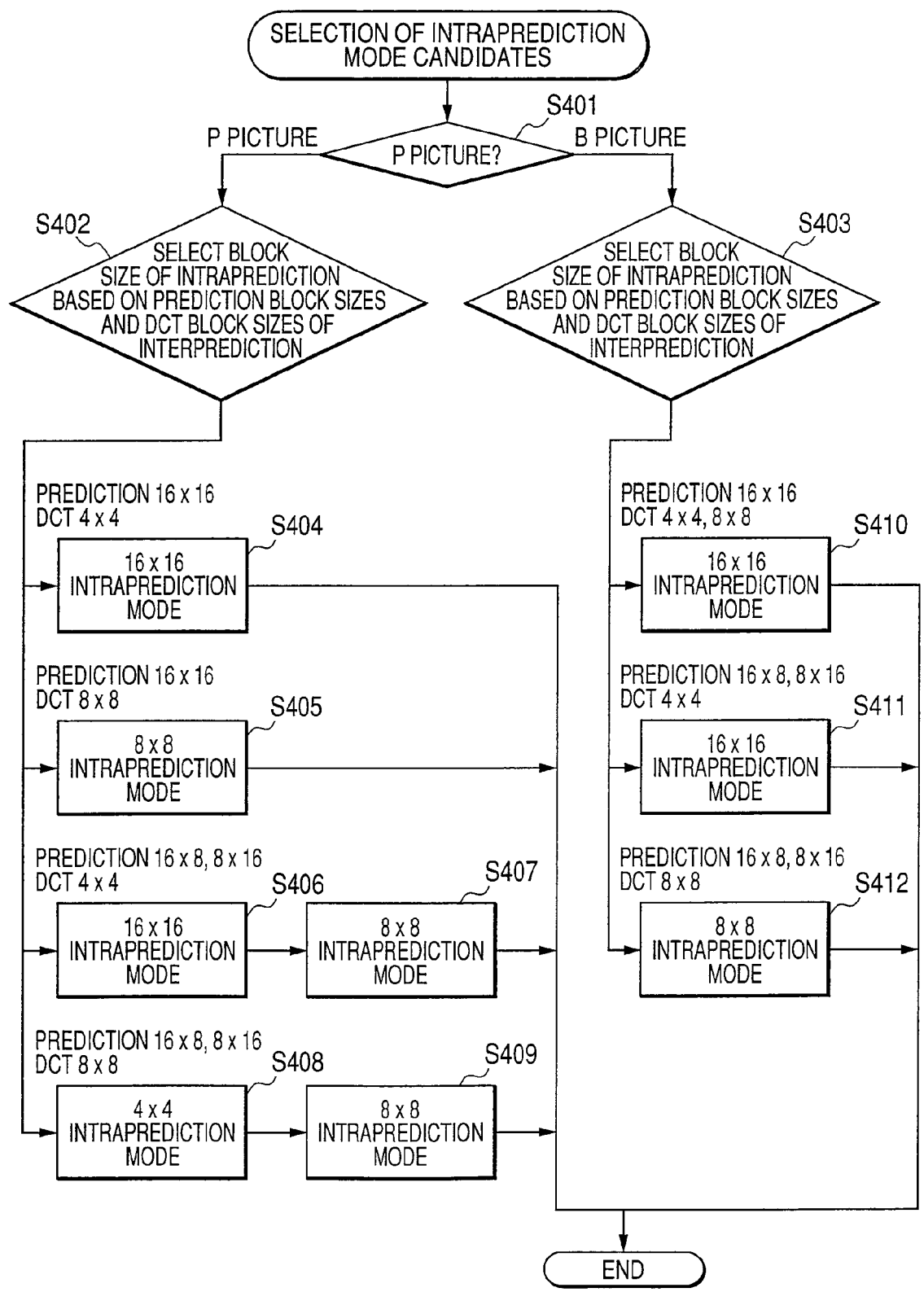
FIG. 8 is an exemplary flowchart to show the processing operation of an intraprediction mode candidate limiting section in a third example.
Figure 9:
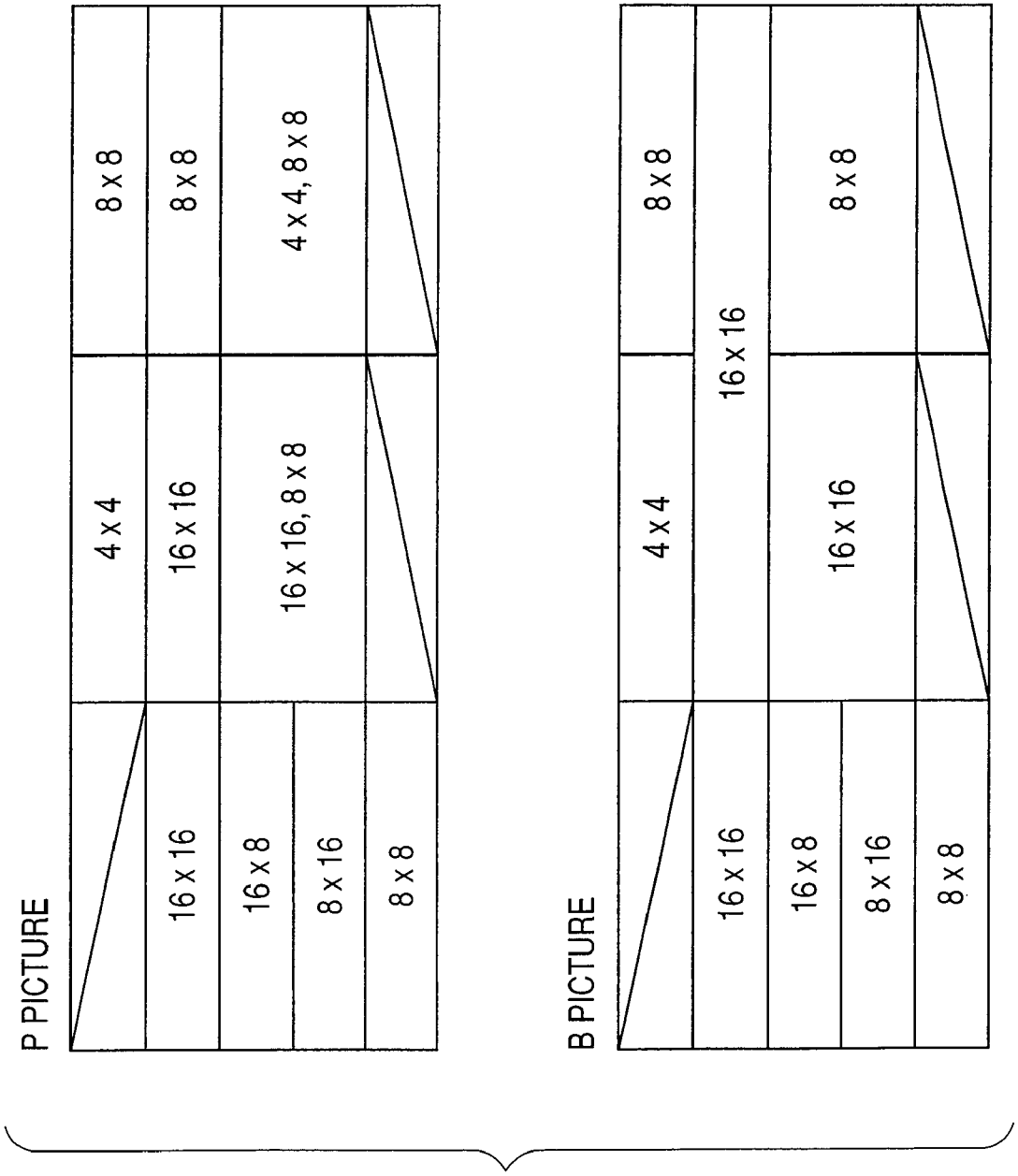
FIG. 9 shows an exemplary selection method of intraprediction mode candidates in the third example shown in FIG. 8.
Figure 10:
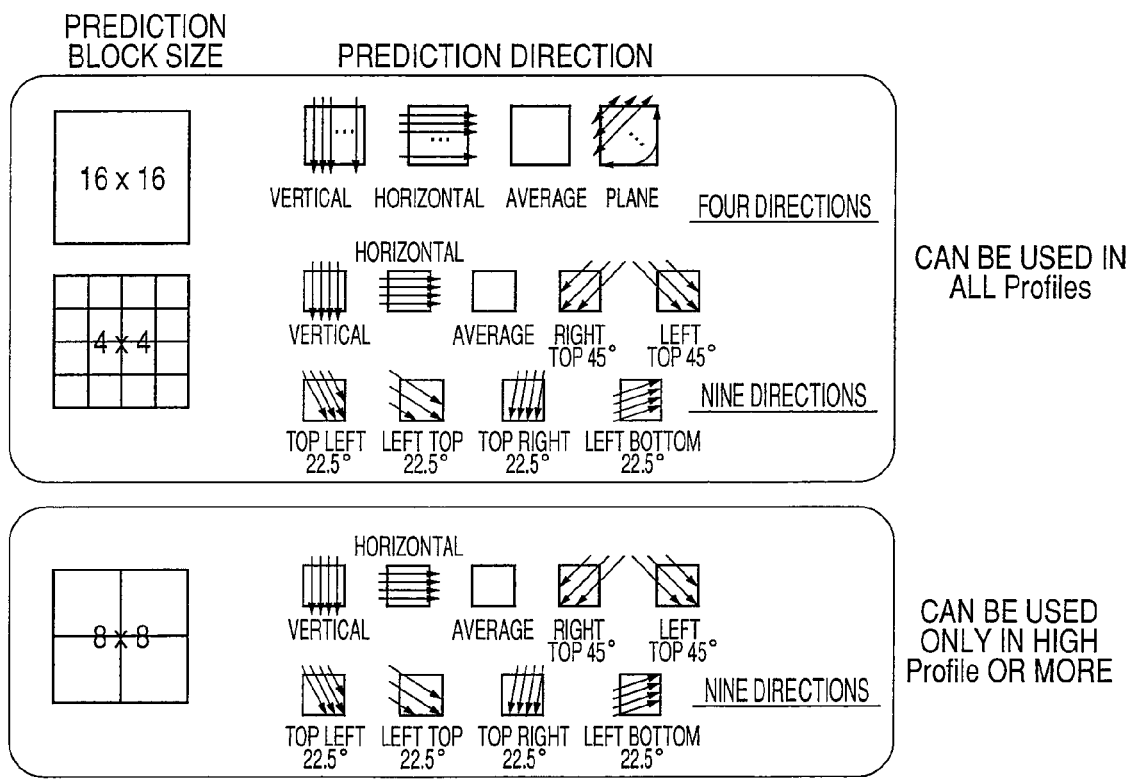
FIG. 10 shows a drawing to describe intraprediction modes in H.264.

FIG. 8 shows an exemplary processing operation of the intraprediction mode candidate limiting section 204 as a third example. FIG. 9 shows an exemplary relation with the prediction block sizes and the DCT block sizes of interprediction relative to the selection method of the intraprediction mode candidates. The column indicates the prediction block sizes and the row indicates the DCT block sizes.

In the example, as in the basic processing operation example shown in FIG. 3, the prediction block size of the intraprediction mode (4×4, 8×8, 16×16) is selected based on the prediction block size and the DCT block size for interprediction. In the third example, the selection method of the intraprediction mode candidates if the block size 8×8 is not selected as the prediction block size of interprediction will be discussed.

First, it is determined which the picture to which the macro block to be coded belongs P or B picture (S401). If the picture is a P picture, when the prediction block size for interprediction is 16×16, if the DCT block size of interprediction is 4×4, the block size 16×16 is selected as the prediction block size for intraprediction; if the DCT block size of interprediction is 8×8, the block size 8×8 is selected as the prediction block size for intraprediction. When the prediction block size for interprediction is 16×8 or 8×16, if the DCT block size of interprediction is 4×4, 16×16 and 8×8 are selected as the prediction block sizes for intraprediction; if the DCT block size of interprediction is 8×8, 4×4 and 8×8 are selected as the prediction block sizes for intraprediction (S402).

If the picture is a B picture, when the prediction block size of interprediction is 16×16, the block size 16×16 is selected as the prediction block size for intraprediction. When the prediction block size for interprediction is 16×8 or 8×16, if the DCT block size for interprediction is 4×4, the block size 16×16 is selected as the prediction block size for intraprediction; if the DCT block size of interprediction is 8×8, the block size 8×8 is selected as the prediction block size for intraprediction (S403).

The third example shows the selection method applied if the block size 8×8 is not selected as the prediction block size for interprediction. As the processing amount reduction method of the encoder, the number of the prediction mode candidates of interprediction may be previously fixedly limited and for use under the condition. The limiting method of the prediction mode candidates of intraprediction if the block size 8×8 is not selected as the prediction block size of interprediction is described.

If the block size 8×8 is not selected as the prediction block size of interprediction, it is considered that the trend of selection of the prediction block sizes and the DCT block sizes for interprediction and the prediction block size of intraprediction changes. Therefore, for the prediction block sizes of interprediction 16×16, 16×8, and 8×16, the selection method of the prediction block size of intraprediction also changes from that in the first example, the second example.

If the processing procedure described above is applied, the intraprediction mode candidates are limited according to the image nature from the prediction block sizes and the DCT block sizes of interprediction, so that it is made possible to adaptively reduce the number of prediction mode candidates to perform an intraprediction mode determination, and the processing amount of the prediction mode determination can be reduced while degradation of the image quality is suppressed.

As described above, the video coding apparatus can well perform video coding processing in real time by reducing the processing amount required for prediction mode determination of an intraprediction mode in P picture, B picture while suppressing degradation of the image quality.

In the second and third embodiments, the intraprediction mode is switched based on the information as to whether the picture is a P picture or a B picture, but the invention is not limited to the mode. For example, the intraprediction mode may be switched based on slice information. FIG. 12 shows the relationship among a macro block, a slice, and a picture. The slice is a unit of continuation of one or more macro blocks. When macro blocks are successive at the maximum, one slice becomes equal to one picture and thus a picture is made up of one or more slices. Different types of slices such as an I slice, a P slice, and a B slice can also be contained in one picture. If the mode is switched in slice units rather than picture units, it can be switched adaptively in finer units, so that there can be provided the advantages that image quality degradation can be more suppressed than that in the picture units and that if one picture contains different types of slices, adaptive processing can be performed.

The invention can be embodied not only as a video coding apparatus as described above, but also as a video coding method including the featuring means contained in such a video coding apparatus as steps. It can also be embodied as a program for causing a computer to execute the steps of the method. The program can also be distributed through a record medium of a CD-ROM, etc., or a transmission medium of the Internet, etc.

Thus, it is to be understood that the invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from all components shown in the embodiment. Further, the components in different embodiments may be used appropriately in combination.

What is claimed is:

1. A video coding apparatus comprising:
a block dividing section that divides each of frames of a video signal into a plurality of blocks;
an intraprediction section that generates prediction signals by a plurality of intra prediction modes for each of the blocks divided by the block dividing section;
an interprediction section that generates prediction signals by a plurality of interprediction modes for each of the blocks divided by the block dividing section; and
a prediction mode determination section that selects an optimum prediction mode from among the plurality of intraprediction modes and the plurality of interprediction modes, the prediction mode determination section comprising:
an interprediction mode determination section that selects a first prediction mode candidate from among the plurality of the interprediction modes;
a candidate limiting section that selects a group of candidates from among the plurality of the intraprediction modes to be either one of (1) intraprediction modes using a DCT block size that is the same with a DCT block size used in the first prediction mode candidate or (2) intraprediction modes using a block size that is the same or smaller than a block size used in the first prection mode candidate;
an intraprediction mode determination section that selects a second prediction mode candidate from among the group of candidates selected by the candidate limiting section; and
an intra-inter-prediction mode determination section that selects one of the first prediction mode candidate and the second prediction mode candidate as the optimum prediction mode.

2. A video coding apparatus comprising:
a block dividing section that divides each of frames of a video signal into a plurality of blocks;
an intraprediction section that generates prediction signals by a plurality of intra prediction modes for each of the blocks divided by the block dividing section;
an interprediction section that generates prediction signals by a plurality of interprediction modes for each of the blocks divided by the block dividing section; and
a prediction mode determination section that selects an optimum prediction mode from among the plurality of intraprediction modes and the plurality of interprediction modes, the prediction mode determination section comprising:
an interprediction mode determination section that selects a first prediction mode candidate from among the plurality of the interprediction modes;
a candidate limiting section that that determines a picture type of a picture to which a macroblock subjected to a coding belongs and selects, when the determined picture type is a P-picture, a group of candidates from among the plurality of the intraprediction modes to be either one of (1) intraprediction modes using a DCT block size that is the same with a DCT block size used in the first prediction mode candidate or (2) intraprediction modes using a block size that is the same or smaller than a block size used in the first prection mode candidate;
an intraprediction mode determination section that selects a second prediction mode candidate from among the group of candidates selected by the candidate limiting section; and
an intra-inter-prediction mode determination section that selects one of the first prediction mode candidate and the second prediction mode candidate as the optimum prediction mode.

3. The video coding apparatus according to claim 2, wherein the candidate limiting section selects a 16×16 size for the block size used in the intraprediction modes when the picture type is a B-picture.

* * * * *